United States Patent [19]
Clauss et al.

[11] Patent Number: 5,229,094
[45] Date of Patent: Jul. 20, 1993

[54] TALC SUBSTANCES HAVING SPECIFIC SURFACE PROPERTIES, METHODS OF MANUFACTURE AND APPLICATIONS

[75] Inventors: Frédéric Clauss; Richard Baeza, both of Toulouse; Yves Pietrasanta, Meze; Alain Rousseau, Montpellier, all of France

[73] Assignee: Talc DE Luzenac (Societe Anonyme), Luzenac Sur Ariege, France

[21] Appl. No.: 839,719

[22] Filed: Feb. 24, 1992

[30] Foreign Application Priority Data

Mar. 29, 1991 [FR] France .................. 91 04001

[51] Int. Cl.$^5$ .................. C01B 33/24; C01B 33/22
[52] U.S. Cl. .................. 423/331; 424/683; 502/410
[58] Field of Search .............. 423/331, 344; 424/683; 502/410

[56] References Cited

U.S. PATENT DOCUMENTS

| | | |
|---|---|---|
| 3,366,501 | 1/1968 | Lamar . |
| 3,939,249 | 2/1976 | Huege .................. 423/178 |
| 3,954,943 | 5/1976 | Newmann et al. .......... 423/331 |
| 3,965,241 | 6/1976 | Baak et al. .............. 423/155 |
| 4,049,780 | 9/1977 | Neumann ................ 423/331 |
| 4,978,516 | 12/1990 | Yamada et al. .......... 423/331 |

FOREIGN PATENT DOCUMENTS

| | | |
|---|---|---|
| 0050936 | 5/1982 | European Pat. Off. . |
| 1174460 | 12/1969 | United Kingdom . |
| 2211493 | 7/1989 | United Kingdom . |

OTHER PUBLICATIONS

"Encapsulation of Inorganic Particle by Emulsion Polymerisation", *Chemisty and Industry*, Aug. 20, 1990, By R. Templeton-Knight, pp. 512–515.

"Hydrophilic Talc", *Chemical Abstract*, vol. 111, No. 26, Dec. 25, 1989, abstract no. 236090R, by Osamu Yamada, p. 180.

*Primary Examiner*—Olik Chaudhuri
*Assistant Examiner*—Ken Horton
*Attorney, Agent, or Firm*—Young & Thompson

[57] ABSTRACT

The invention relates to talc substances consisting of particles having a sheet structure. These substances are characterised in that each particle has internally the crystalline structure of talc which confers upon it certain specific properties of this mineral (softness, thermal stability) and has hydrophilic surface properties unlike the hydrophobic properties of mineral talc which give rise to useful reactivity. The substances according to the invention have a thermal and chemical stability range similar to that of talc. They can be manufactured by thermal or chemical means under conditions designed to avoid internal conversion of the talc and to effect the surface modifications consisting of replacing inert siloxane bridges by active hydrophilic groups.

6 Claims, 8 Drawing Sheets

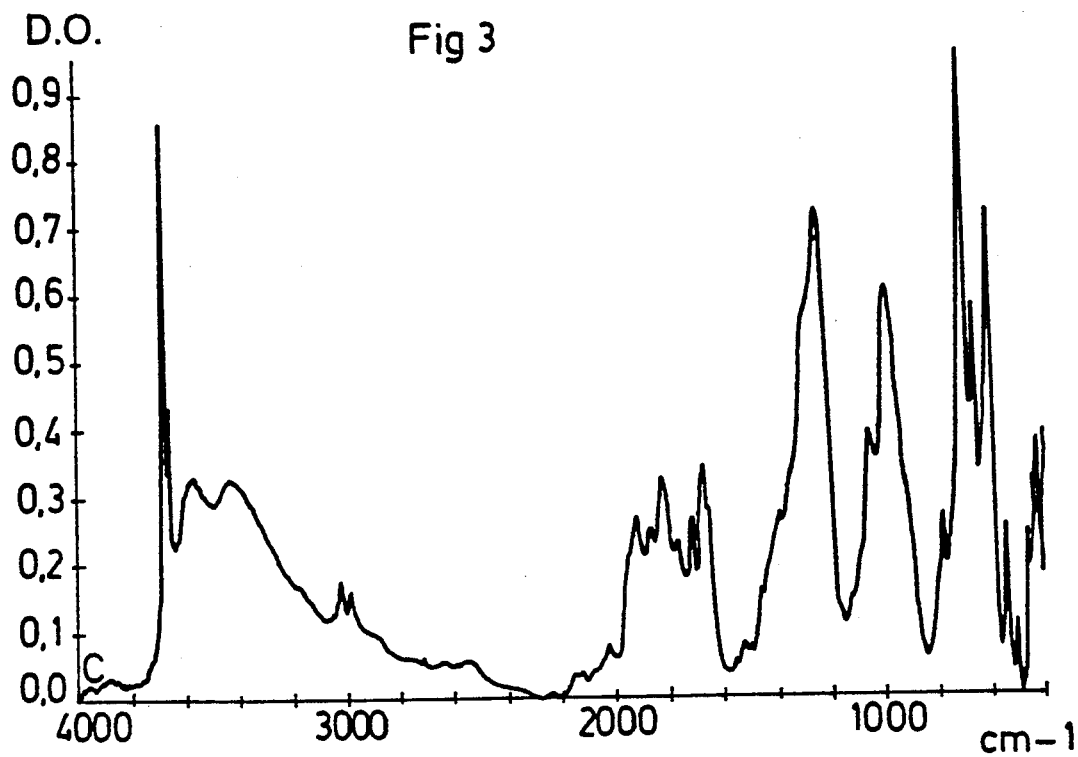
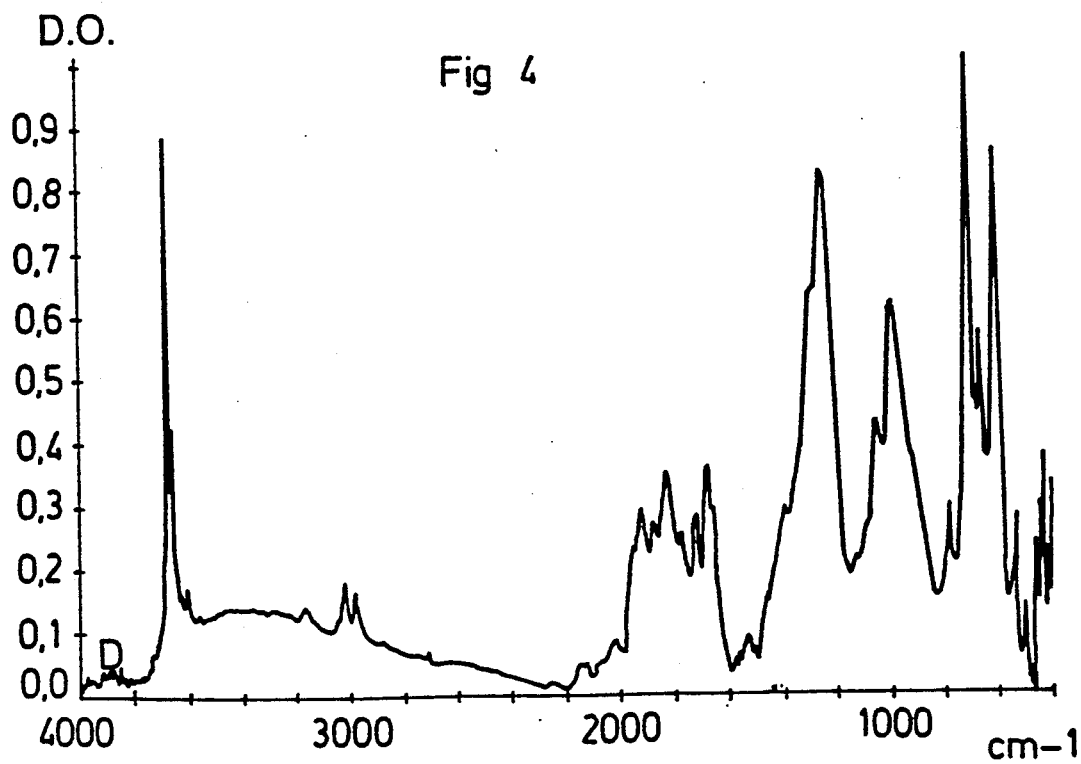

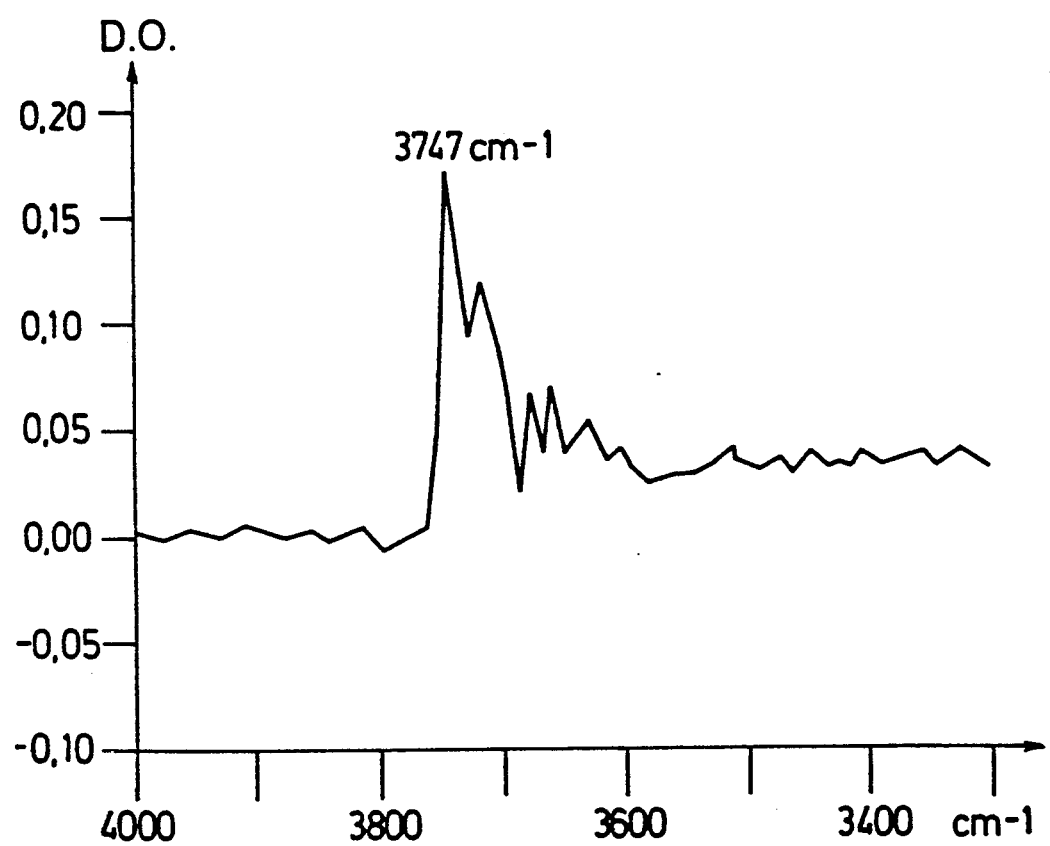

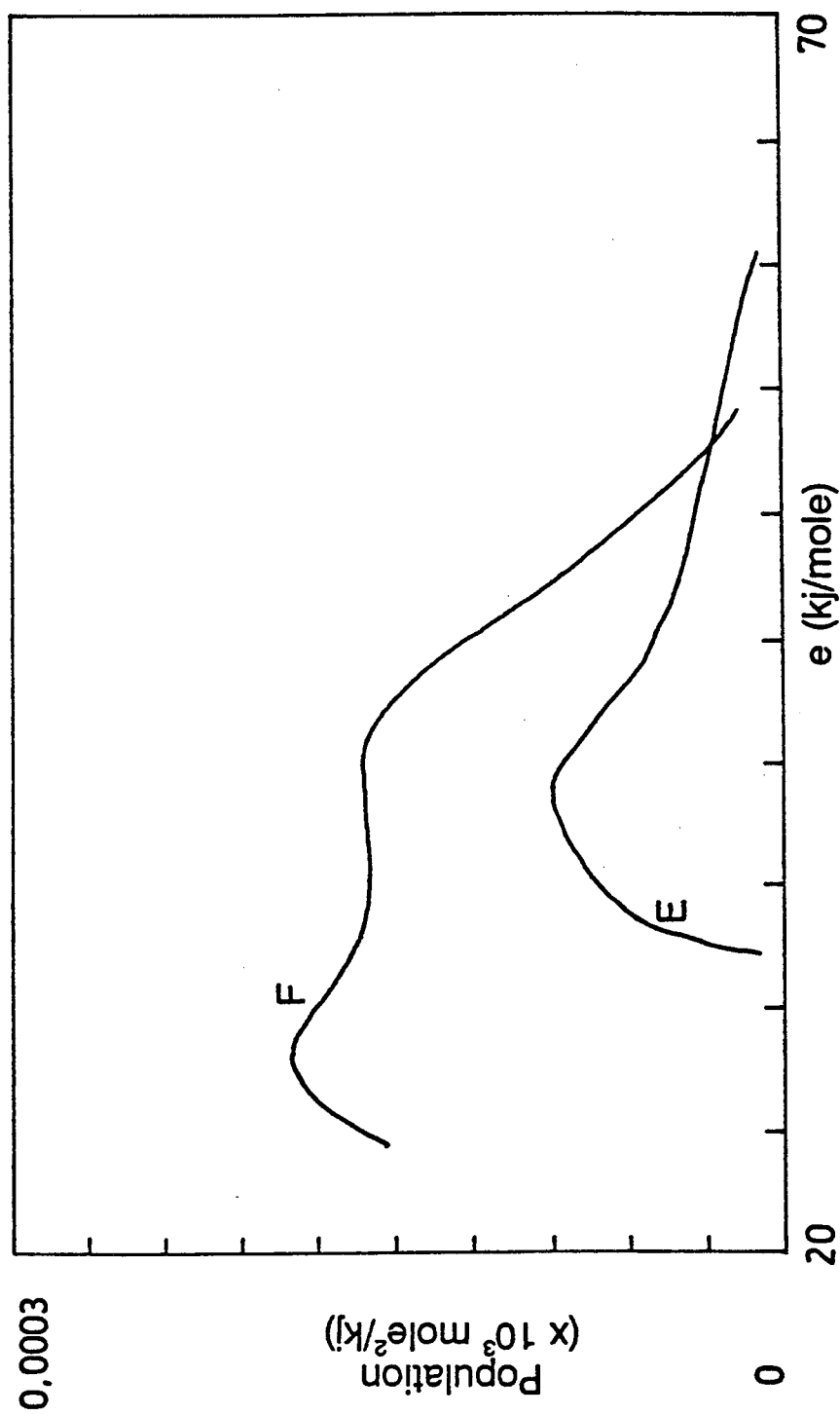

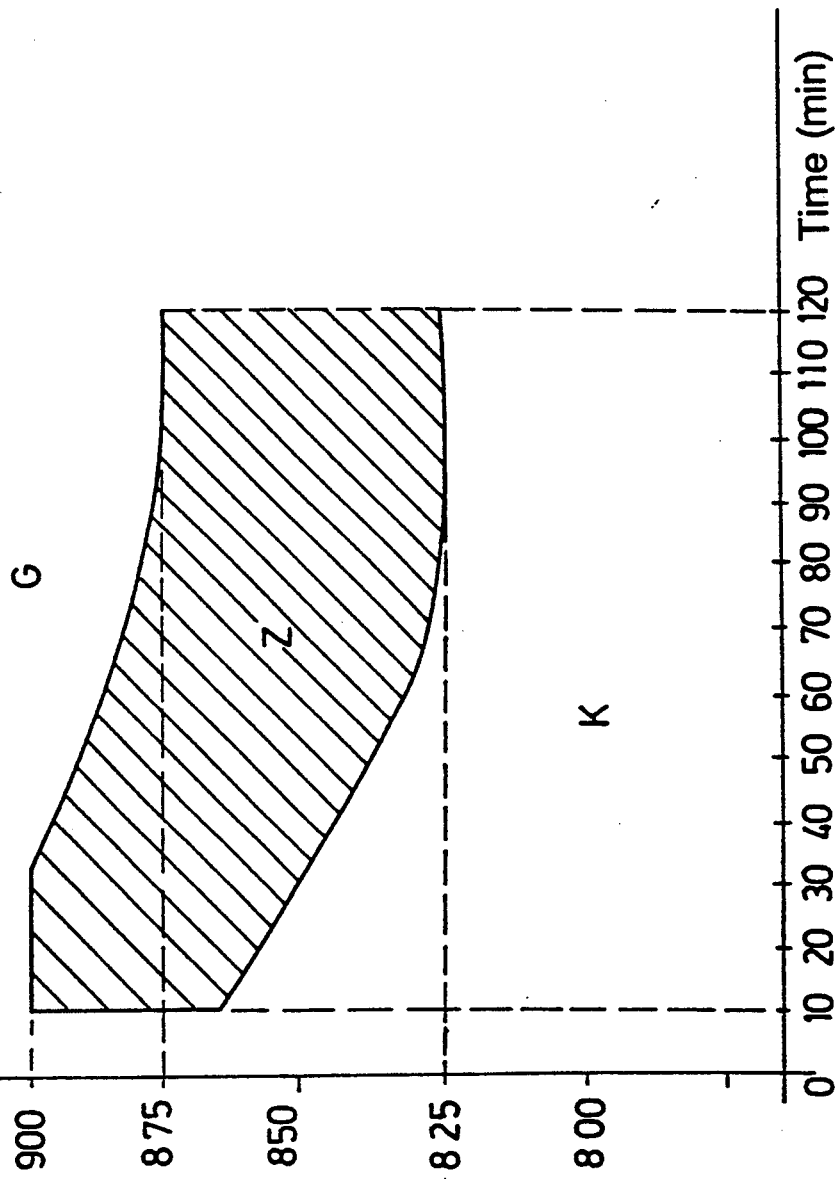

TALC SUBSTANCES HAVING SPECIFIC SURFACE PROPERTIES, METHODS OF MANUFACTURE AND APPLICATIONS

BACKGROUND OF THE INVENTION

The invention, which is due to collaboration between the Applied Chemistry Laboratory of the Ecole Nationale Supérieure de Chimie at Montpellier and the Société Talc de Luzenac, relates to new talc substances having specific surface properties and a method for their manufacture. The word "talc" will be taken below to refer to the hydrated magnesium silicate mineral, and "talc substance" will be taken to relate to a substance essentially consisting of hydrated magnesium silicate which has certain properties characteristic of talc, in particular the sheet nature of its structure, its softness and its thermal and chemical stability. It should be noted that talc mineral frequently consists of a mixture of the mineral "talc" as defined above and associated minerals: chlorite (hydrated magnesium aluminium silicate), dolomite (calcium magnesium carbonate), etc. Of course the talc substances to which this invention relates may contain the aforesaid associated minerals. The invention includes applications of these new manufactured substances.

Talc is a mineral which has many industrial applications: as a filler in paper, as a paper coating pigment, as an additive for the control of pitch and resin in paper ("pitch control"), as a reinforcing filler for thermoplastics, a filler for paint, a thixotropic additive, an anticlumping additive, a cosmetic base, a raw material in the manufacture of ceramics, etc. However talc is a hydrophobic and inert mineral, properties which result in some disadvantages in certain existing applications, which can restrict its field of use. For example, for applications in the paper industry, the hydrophobic nature of talc complicates mixing procedures in aqueous media and weakens its bond to cellulose, which results in the occurrence of powdering (the release of talc from the surface of the paper). In applications as a filler in plastics materials the inert nature of the talc prevents it from bonding tightly to the plastics matrix, which limits certain mechanical properties of the filled composite.

At the present time the best known process for masking the hydrophobic and inert properties of talc is to encapsulate each particle in an envelope having the desired properties (P. Godard, J-P. Mercier: Double Liaison - Chimie des Peintures, (387) 3/19 (1988). R. Templeton-Knight: Chemistry and Industry (August) 512 (1990)). However such a procedure may mask the other properties of talc (for example its sheet structure). Also, and above all, the lack of any chemical bond between the envelope and the talc particle does not in general make it possible for the final mechanical properties to be increased significantly in comparison with those obtained using a non-encapsulated talc filler, particularly so when the envelopes of synthetic material generally provided are fragile and have little thermal stability. Patent EP-A-0.050.936 describes a process of coating with magnesium hydroxide obtained by the action of an aqueous solution of caustic soda on the talc at low temperature (below 65° C and generally at ambient temperature). The magnesium of the talc is dissolved in the solution and precipitates on the particles in the form of magnesium hydroxide. This deposit makes the substance apparently hydrophilic, but is very easily removed by e.g. acid washing, ultrasound, etc., and the initial particles of hydrophobic talc are then left. As before, a product of this kind has no stability.

Furthermore, patents GB-A-2 211 493 and JP-A-0.113.018 (Chemical Abstracts, vol. 111, no. 26, Dec. 15, 1989, Columbus, Ohio, U.S., abstract no. 236090R, page 180) describe a process of treating talc with phosphoric compounds such as phosphoric or pyrophosphoric acids. This process produces a deposit of phosphate around the talc particles which gives them apparently hydrophilic properties. As before, this deposit is unstable and easily removed, particularly by washing in bases, ultrasound, etc.

In the case of the substances with an apparently hydrophilic nature described previously the hydrophobic nature of the initial talc is merely masked by a peripheral deposit which is not incorporated into the crystalline structure of the talc and which can easily be removed. This being the case, it is clear that the hydrophilic property conferred will be very labile, and it will not be possible to graft external molecules onto this deposit in order to obtain a complete particle with good cohesion (in which the external molecules are stably bound to the talc).

Furthermore, where the talc is used as a reinforcing filler for thermoplastics materials it has been found that the talc undergoes a thermal transformation into a mixture of enstatite and silica which forms a stable filler which significantly increases the mechanical properties of the thermoplastics obtained (see patents FR 2.527.620 and FR 2.585.691). However, such a conversion (described as "calcination") is very costly because of the high temperatures required (in practice between 1150° C. and 1220° C.), which need a specific technology (directly heated rotary furnaces, which become essential above 900° C.). Furthermore and above all, this conversion results in a different product which is no longer talc and no longer has its properties (in particular it has a very hard crystalline structure). This product has certain specific characteristics (in particular an abrasive property) which restricts its applications as a filler in thermoplastics.

SUMMARY OF THE INVENTION

This invention provides a process for the manufacture of new stable talc substances formed of particles which have the internal structure of talc, and therefore possess certain characteristic properties of the latter such as a sheet structure, softness, thermal stability, while having thermally and chemically stable modified surface properties: a hydrophilic and/or reactive nature towards a large number of compounds.

One object of the invention is to provide talc substances of the aforesaid type in which the particles are uniform, stable and resistant to external agents and conditions of use (heat resistance, resistance to shear and resistance to solvents).

For this purpose the basic talc substance according to the invention consists of particles having a sheet structure. Each particle comprises internal hydrophobic sheets which have the crystalline structure of talc within each unit and are connected together by cohesive forces typical of those of talc (Van der Waals forces). The substance according to the invention is characterised in that each particle comprises at least one sheet having a hydrophilic surface:
comprising a system of silicon oxide tetrahedra bearing hydrophilic sites, bound to the internal sheets by forces of the same type as the cohesive forces existing between the said internal sheets.

In particular, the said substance, which can be manufactured from talc by the methods described below, is formed of particles whose internal sheets have hydrophilic silanol SiOH groups.

Thus the talc substance according to the invention is formed of stable uniform particles (unlike encapsulated particles or particles covered with a deposit), which retain the essential characteristics of talc through their internal crystalline structure (sheet structure, softness, thermal stability) but have stable hydrophilic properties and reactivity (unlike the hydrophobic and inert nature of talc) because of the sites which form part of the surface sheet structure.

DETAILED DESCRIPTION OF THE INVENTION

The talc substance according to the invention can in particular be manufactured through the use of heat by heating talc particles to a temperature below 900° C. under conditions such as to avoid conversion of the talc into enstatite and effecting a surface modification consisting of replacing the inert siloxane bridges by active silanols. As will be seen below, these conditions can be obtained by appropriately adjusting the temperature and treatment time to bring about the surface substitutions mentioned above while avoiding converting the talc into enstatite (a conversion which is characteristic of known calcination processes: patents FR 2.527.620 and FR 2.585.691). Analysis has shown that the method of manufacture using heat defined below brings about inversion at the surface of some of the silicon oxide tetrahedra forming the talc, with the effect of directing their active apices outwards and making the active silanol groups (SiOH), which form the said apices, accessible, while leaving the remainder of the crystalline structure of the particles intact. Thus the talc substance obtained is characterised in that each surface sheet is formed of a network which includes:

silicon oxide tetrahedra in a crystalline arrangement identical to that in talc, the inert bases of the said tetrahedra forming the surface of the sheet,
silicon oxide tetrahedra which are inverted with respect to the above, the said inverted tetrahedra having an active apex located at the surface of the sheet forming an SiOH silanol group.

The talc substance according to the invention may also be manufactured by chemical means. In accordance with a first embodiment using the chemical route the talc is suspended in the presence of a free radical initiator in a liquid medium which is a solvent for the said initiator and can be cut by the radicals produced by the initiator under conditions such that the siloxane bonds at the surface of the particles are opened up and replaced by hydrophilic groups. This process is advantageously implemented by:

using a free radical initiator consisting of at least one compound from the following group: diazo, peroxide, organic peroxide, peracid, disulphide, thiouram, or xanthogen compounds, and tetramethylethane derivatives,
using a halogenated organic compound or a mixture of halogenated organic compounds as solvent, or a third solvent containing a thiol group which can be detached by the radicals produced by the initiator,
heating the suspension to a temperature at least equal to the decomposition temperature of the free radical initiator so as to maintain the free radical reaction in the medium.

Analysis has shown that the chemical process defined above is capable of opening certain (inert) siloxane bonds at the surface, probably by free radical attack on the corresponding silicons, and simultaneously fixing hydrophilic groups there. Thus the talc surface obtained is characterised in that each surface sheet includes inert siloxane bonds characteristic of talc and hydrophilic SiOH, SiX or SiRX groups, where X is a halogen and R is an organic chain, these groups appearing to be located on adjacent silicon atoms replacing a siloxane bridge in talc.

Another embodiment using the chemical route comprises:

heating the talc particles in an autoclave to a temperature of at least 150° C. in the presence of water and a water-soluble mineral base,
maintaining the reaction medium at temperature in the autoclave for a suitable period to cause hydrolysis of a predetermined proportion of the siloxane groups present at the surface of the talc particles,
after cooling, filtering the reaction medium to separate out the solid phase.

In particular this embodiment may incorporate the following operating conditions:

the talc particles are suspended in an alkaline hydroxide solution in such a way that the ratio of the number of moles of hydroxide at the surface of the particles is greater than $10^{-4}$ mole/m$^2$,
the reaction medium so obtained is raised to a temperature between 150° C. and 300° C. in the autoclave,
the medium is maintained at temperature in the autoclave for at least 45 minutes,
after filtering the solid phase is neutralised by washing with an acid solution, and then a neutral solution, and the talc substance obtained is dried.

Also, a variant of the above embodiment comprises:

heating talc particles in an autoclave at a temperature of at least 150° C. in the presence of an organic base,
keeping the reaction medium at temperature in the autoclave for a period sufficient to cause hydrolysis of a predetermined proportion of the siloxane groups present at the surface of the talc particles,
after cooling, placing the medium in the presence of an acid solution and filtering the reaction medium to separate out the solid phase.

As in the process involving free radical attack, some inert siloxane bonds are opened by attack by the base at the temperature and pressure in the autoclave. The hydrophilic groups which form from the sites opened up in this way are produced directly in the autoclave when an aqueous solution of a mineral base is used, or subsequently by acid hydrolysis where the variant using an organic medium is used.

Physical and chemical analysis of the talc substances according to the invention (whether manufactured by heating or the chemical route) have shown that they can be characterised by:

an X-ray diffraction spectrum identical to that of talc, free from the characteristic peaks for enstatite,
an infrared spectrum similar to that of talc, having additional weak bands characteristic of the hydrophilic groups produced, in particular silanol bands at 3747 cm$^{-1}$, adsorption isotherms for modified polar and/or nonpolar test substances, giving rise to bimodal surface energy distribution diagrams (Rudzinski-Jagiello method, reference: J. Colloid Interface Sci, 48, 478, 1982), a Wettability index (Stevens index, reference: Farmaceut Tijdschrift. Belgium, 51(2), 150, 1974) of between 50 and 71.3 (expressed in mJ per m$^2$), particle stability identical to that of talc in the presence of an acid solution or a basic solution.

It should be emphasised that the structural characteristics are the same as those of talc (lack of other crystalline species such as enstatite), whereas the surface properties are different, while the substance consists of homogeneous and stable particles.

The invention extends to applications of the aforesaid talc substances, which consists of treating these in such a way as to confer one or more predetermined surface properties upon them. The treatment process uses the hydrophilic surface sites on the substance (particularly silanol groups) and consists of fixing upon these sites molecules which have both a group providing attachment to the said sites and one or more groups conferring the desired property or properties. Molecules of the following families can in particular be attached to the hydrophilic surface sites: epoxides, isocyanates, organic acids, acrylic acids, alcohols, acyl chlorides, anhydrides, organosilanes including at least one hydrolysable group (alkoxysilanes, chlorosilanes, etc.), in order to confer surface reactivity towards a specific organic matrix upon the substance. The chemical groups characteristic of these families have the property of reacting with the silanol group, thus creating a strong bond with the particle. Choice of the compound used from these families will be dictated by the envisaged application; for example compounds having as other reactive groups:

unsaturated groups, in the case of a mixture containing monomers which are to be polymerised (plastics, paints, etc.), hydroxyl groups, in the case of incorporation into paper (polyvinyl alcohol, cellulose resins, etc.) or a cosmetic preparation (polysilanols) may be selected.

Another type of application for the talc substances according to the invention consists of fixing at least one colouring agent to the hydrophilic surface sites so as to obtain a coloured mineral filler. The colouring agent or agents selected will be selected so as to have affinity with the hydrophilic groups of the talc substances used.

Another application consists of fixing at least one pharmacologically active material to the surface hydrophilic sites so as to obtain an active substance with a mineral framework. In particular this process can be used to prepare pharmaceutical or cosmetic products in which the active substance is carried by a mineral framework which is accepted perfectly well by living tissue.

Another application consists of fixing an electrically conducting oligomer or polymer to the surface hydrophilic sites so as to obtain an electrically conducting mineral substance (in particular: a paint or plastics material which allows electrostatic charges to flow).

The invention extends to talc substances obtained following such treatment, characterised in that the internal structure of the particles is identical to that of talc, with one or more molecules fixed to its hydrophilic sites on the surface.

The invention is illustrated by the following examples with reference to the appended drawings:

BRIEF DESCRIPTION OF THE DRAWINGS

FIGS. 1, 2, 3, 4, 5 and 6 are comparative diagrams obtained for example 1, respectively of the X-ray diffraction spectrum (FIGS. 1, 2), infrared spectrum (FIGS. 3, 4, 5: in these figures the absorbance is plotted as the optical density OD on the ordinate with the wavelength as the abscissa) and the octane adsorption energy distribution diagram (FIG. 6), FIG. 8 is a diagram showing temperature/treatment time pairs obtained in example 2.

EXAMPLE 1

Preparation of a Hydrophilic Talc Substance by Thermal Means

Starting Material

The starting material used was a mixture called "Luzenac 00" containing 90% of talc (hydrated magnesium silicate), 8% of chlorite (hydrated magnesium and aluminium silicates), 1% of dolomite (calcium and magnesium carbonate) and 1% miscellaneous. The particle size characteristics of the product were as follows: D99 cut diameter=50 microns, mean D50 diameter=10 microns; Stevens wettability index 40 mJ/m$^2$, characteristic of a hydrophobic material.

Figure 1:
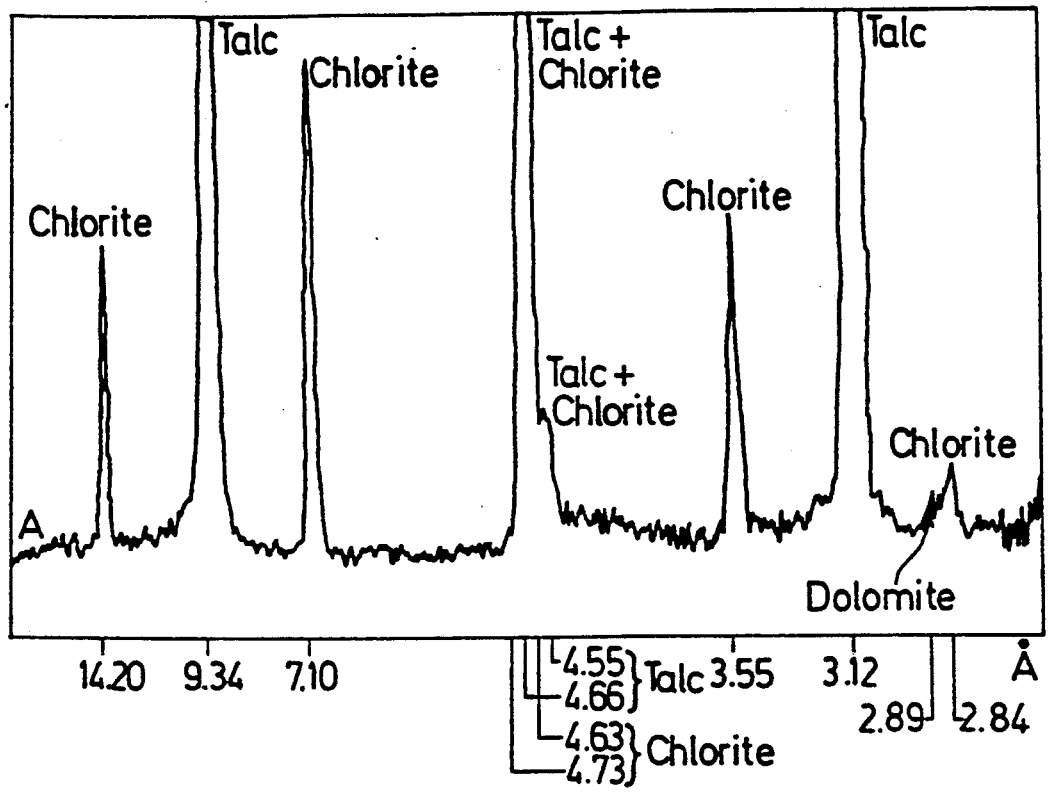

The diffraction spectrum of this starting material is shown by diagram A in FIG. 1. The characteristic peaks of talc, chlorite and dolomite can be seen.

The infrared spectrum of the material is shown by diagram C in FIG. 3.

An adsorption energy distribution diagram (calculated from the octane adsorption isotherm at 70° C. obtained by reverse chromatography in the gas phase and then processed by the Rudzinski-Jagiello method) is shown in FIG. 6 (line E). A single type of poorly populated adsorption site characteristic of talc is observed.

Preparation

The starting material was placed in a vessel of non-polluting refractory material (aluminosilicate fibres) without settling. This vessel was placed in an electric muffle furnace at a temperature of 875° C. for 30 minutes. The material was then cooled in air down to 20° C.

Nature of the Talc Substance Obtained

The particle size characteristics are unchanged in comparison with those of the starting material, which shows that the particles have not been geometrically altered. Thermogravimetric analysis to determine the mineral composition shows that 90% of the talc is recovered, but that chlorite and dolomite are converted.

Figure 2:
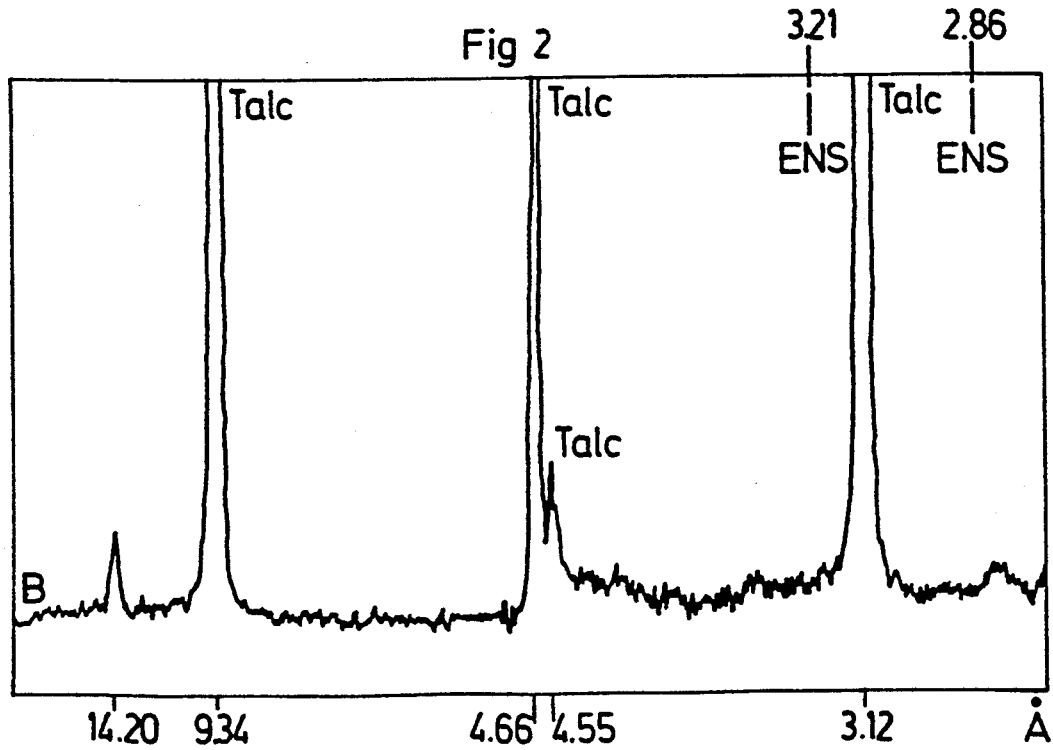

The diffraction spectrum of the talc substance is shown by diagram B in FIG. 2. This diagram is identical to that for the starting material (A) except for the chlorite and dolomite peaks, which have disappeared (it should be noted that the small peak at 14.2 Å corresponds to the residue from the dehydration of chlorite). This diagram is characteristic of the crystalline structure of enstatite-free talc. (For illustration the characteristic peaks of enstatite have been marked at ENS in FIG. 2).

Similarly the infrared spectrum of the substance (diagram D in FIG. 4) is characteristic of a pure, enstatite-free talc structure.

FIG. 5 provides the infrared diagram obtained by subtracting the diagram for the initial talc (FIG. 3) from the diagram for the talc substance obtained (FIG. 4). Magnification of the region around 3800 cm$^{-1}$ shows the presence of an absorption peak at 3747 cm$^{-1}$ which is characteristic of the presence of silanol groups.

The adsorption energy distribution diagram for the substance (diagram F in FIG. 6) shows a bimodal curve, showing that at least one new type of adsorption site has been created, and the two visible sites are highly populated. The substance obtained therefore has radically different surface properties from those of the starting material.

The wettability index is 71.3 mJ/m$^2$, which is characteristic of a very hydrophilic material, which is immediately wetted by water.

The results shown above show that the talc substance obtained unexpectedly has the following two characteristics at the same time:
an internal crystalline structure identical to that of talc,
hydrophilic properties in contrast to the natural hydrophobic nature of talc.

Hardness measurements show that the hardness of the talc substance remains low (of the order of that of talc). Also high temperature tests show that the thermal stability of talc is retained and the hydrophilic properties are themselves thermostable.

In addition to this the talc substance was subjected to various forms of chemical attack to determine its stability.

In particular it was immersed in a stirred bath consisting of acid solutions (hydrochloric acid, sulphuric acid) and basic solutions (caustic soda). After this, the talc substance was rinsed with water, dried in a stove at 120° C. and analysed. The particles retained the same structure, the hydrophilic surface sheets were unaffected. Similar forms of attack were effected by varying the acids and the bases, their concentrations and their temperatures. It was found by comparison that the stability range for the hydrophilic talc substance according to the invention was identical to that for the initial talc.

Figure 7A:
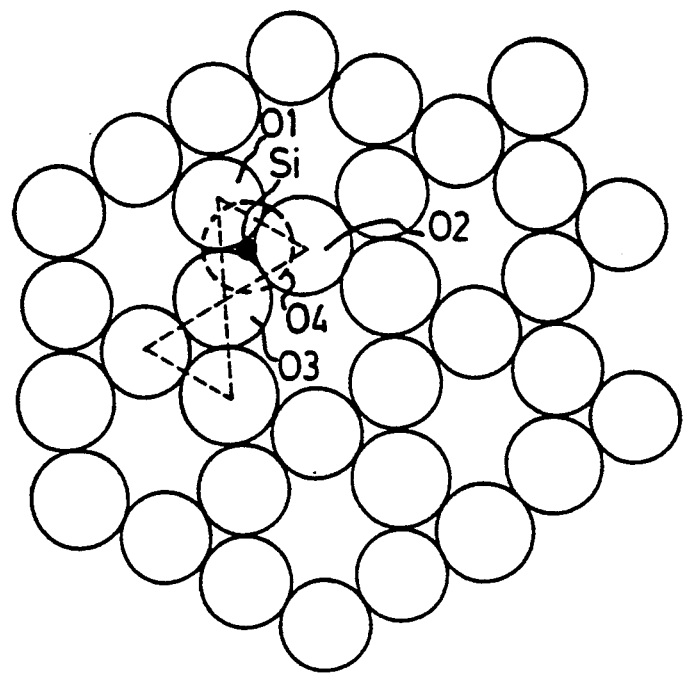
FIGS. 7a and 7b are diagrams explaining the internal structure and the surface structure of the talc substance obtained in example 1.
Figure 7B:
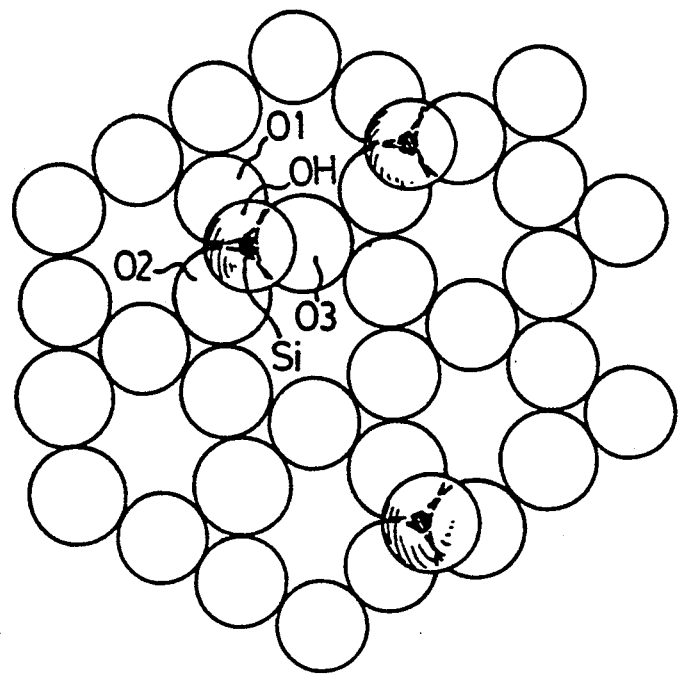

Interpretation of all the results obtained resulted in the diagrams in FIGS. 7a and 7b which illustrate the internal and surface structures of the substance. FIG. 7a shows the silicon oxide tetrahedra which form the internal sheets of the substance: three oxygens $O_1$, $O_2$, $O_3$ form the base of a tetrahedron located at the surface of the sheet. One oxygen $O_4$ in the lower plane forms the opposing apex, with a silicon being located within the tetrahedron. These internal sheets are bonded together by Van Der Waals forces. FIG. 7b shows a surface sheet of a particle of the substance: some tetrahedra are reversed and have an active apex located at the surface of the sheet, this apex consisting of a hydroxyl group OH bonded to the silicon of the tetrahedron to form a silanol group SiOH. The surface sheets are connected together and to the internal sheets by the same cohesive forces which bind the internal sheets together (Van der Waals forces).

EXAMPLE 2

Preparation Using Thermal Means

In this example the starting material was the same as before and the temperature and time conditions were adjusted to change so as to produce the range in which a talc substance similar to that obtained in example 1 is obtained.

The diagram obtained is shown in FIG. 8. Hatched area Z in this diagram shows the temperature/time pairs which will bring about the aforesaid surface changes without adversely affecting the internal crystalline structure of the talc. If conditions are too severe (area G above hatched area Z), the talc is converted into enstatite with loss of its internal properties (sheet structure and softness in particular). If conditions are too mild (area K below the hatched area) the energy imparted is too weak to cause the tetrahedra to be overturned and confer significant hydrophilic surface properties. With times less than 10 minutes, the temperature throughout the sample is not satisfactorily uniform. Over two hours the time no longer has any effect, as the product does not change any more. In practice, for economic reasons, times are limited to less than two hours.

EXAMPLE 3

Preparation by Chemical Means Using a Free Radical Initiator

The starting material was the same as in example 1 and five samples were treated with different quantities of a free radical initiator consisting of benzoyl peroxide.

The talc in each sample was suspended in carbon tetrachloride containing, for every 100 grams of talc:
sample 0: no initiator,
sample 1: 0.4 g of initiator,
sample 2: 1.6 g,
sample 3: 6.5 g,
sample 4: 25.5 g.

Each mixture so constituted was placed in a sealed reactor and stirred for 12 hours at 130° C. The decomposition temperature of the free radical initiator was 71° C. (10 hour half-life temperature).

This temperature of 130° C. was selected following several individual tests for decomposition of the initiator and maintenance of the free radical reaction.

The products obtained were cooled, removed from the reactors, filtered and washed with carbon tetrachloride. The powders were dried in a stove at 100° C. for 24 hours.

Nature of the Substances Obtained particle size composition: unchanged,
mineralogical composition by thermogravimetric analysis: unchanged,
diffraction spectrum: unchanged (precisely identical to that of the starting material, which shows that when the chemical route is used the associated minerals: chlorite, dolomite, etc., are retained),
infrared spectrum: characteristic bands for the starting materials (talc, chlorite, etc.) present, with a broad band characteristic of water in the case of samples 1 to 4 (showing the hygroscopic nature of the substances obtained, with the exception of sample 0), Stevens wettability index:
40 mJ/m² for sample 0,
55 mJ/m² for samples 1 to 4,
stability to acids and bases: identical to that of talc.

These results show that sample 0 underwent no significant changes, while the other samples subjected to the free radical reaction show the following three features simultaneously:
internal crystalline structure identical to that of talc, hydrophilic surface properties,
hygroscopic properties.

The hardness measurements and the temperature tests show that the softness of talc and its thermal stability are retained.

Through interpretation of the results it is possible to put forward the following mechanism for the surface change. The free radicals produced in the medium break open certain siloxane bonds in the surface sheets of the particles and these bonds are replaced by hydrophilic bonds, especially, in the example in question, SiCl, SiCl₃ and SiOH (by hydrolysis of the former).

EXAMPLE 4

Preparation by Chemical Means Using Other Free Radical Initiators

The preparation in example 3 for example 1 was reused with the following initiators, in the same solvent:
a 2-2'azo-bis(isobutyronitriles) of the diazo family,
the commercial product "PERKADOX 16S" (a trade mark lodged by the "AKZO" company) of the organic peroxide type.

The results were identical to those for example 3 and the substances obtained are characterised by an internal crystalline structure of the talc+chlorite type, hydrophilic surface properties, hygroscopic properties and stability identical to that of the initial talc.

EXAMPLE 5

Preparation by Chemical Means Using a Mineral Base

Starting Material

The starting material used was a mixture described as "Steamic OOS" (a trade mark lodged by the applicant company) containing 78% of talc, 21% of chlorite and 1% of dolomite. The particle size characteristics of this material were as follows: diameter of the D99 cut=10 microns, mean D50 diameter=1.9 microns. Its very high specific surface area was 12 m²/g, its Stevens wettability index was 45 mJ/m².

Preparation

The starting material was mixed with an aqueous solution of sodium hydroxide in an autoclave. The ratio RP of the number of moles of hydroxide to the surface area of the particles was adjusted to values between 0 and 7 0.10⁻⁴ mole/m².

Each of the suspensions obtained was treated in the autoclave under the following conditions with stirring:
temperature: 160° C.,
pressure within the autoclave: 6 bars,
time: 3 hours.

The autoclave was then cooled to ambient temperature and the medium was filtered to separate out the solid phase, which was washed with dilute (N/10) hydrochloric acid, rinsed with water and then dried for 24 hours in a stove at 120° C.

Properties of the Talc Substances Obtained

The physical properties (particle size, specific surface area) of the substances were unchanged.

Figure 9:
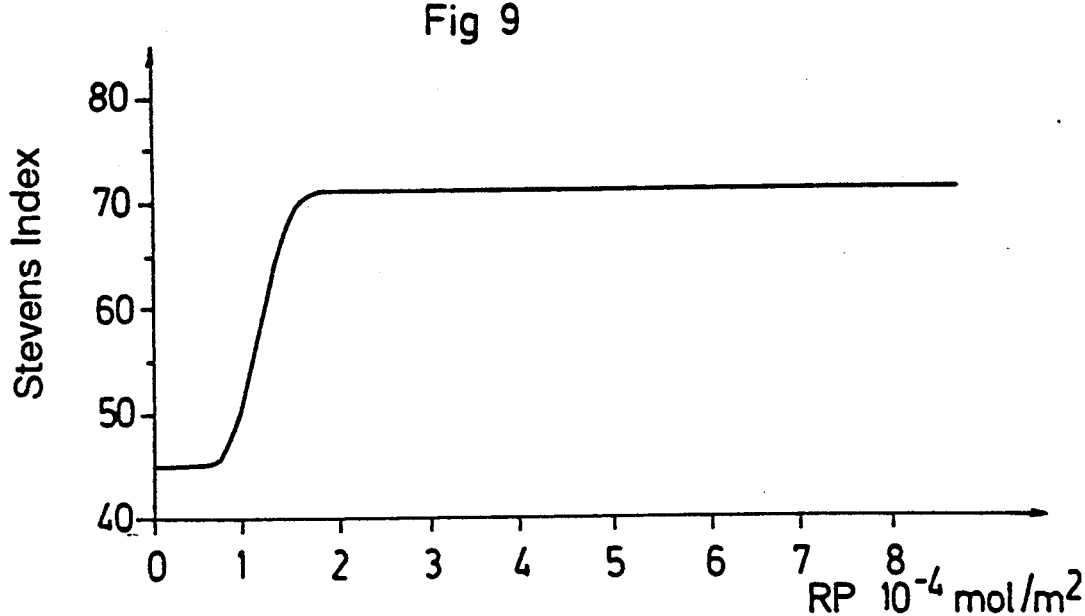
FIG. 9 is a diagram linking the Stevens wettability index (millijoule/m$^2$) to the ratio between the quantity of caustic soda and the surface area of the talc for the substances obtained in example 5.

Hydrophilic properties were determined by measuring the Stevens wettability index, from which the graph in FIG. 9 was drawn. The substance remained hydrophobic for values of the RP ratio below 0.6 0.10⁻⁴ mole/m². It then became more hydrophilic between 0.6 0.10⁻⁴ and 1.9 0.10⁻⁴ mole/m². Above this value the substance was completely and immediately wetted by water (Stevens index=71). The substance can be taken to have hydrophilic surface properties above an RP ratio of 10⁻⁴ mole/m².

Figure 10:
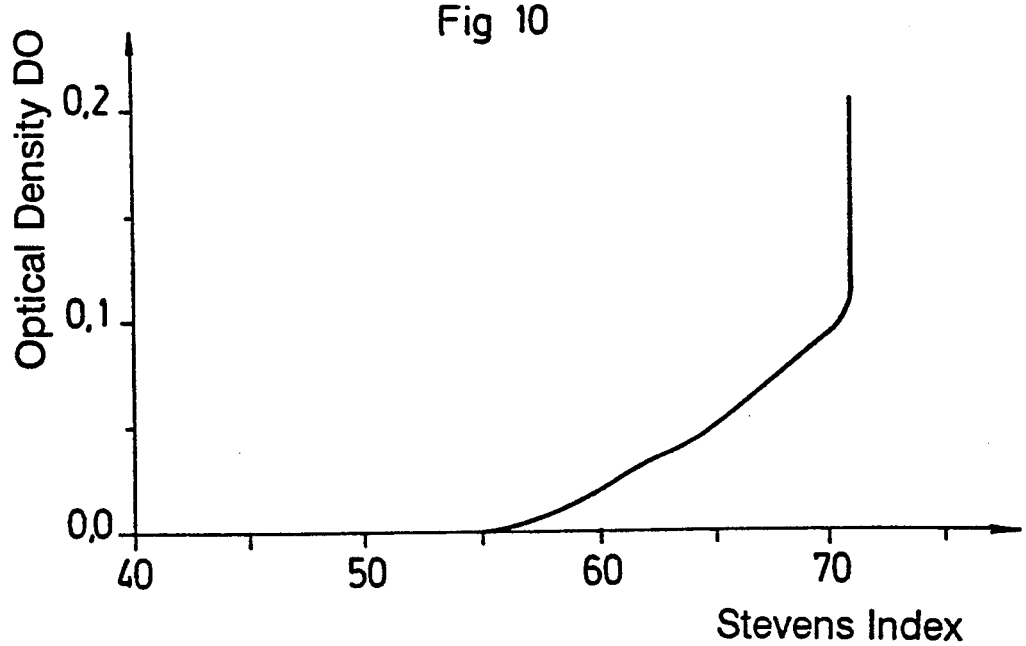
FIG. 10 is a diagram linking this wettability index to the number of silanol groups obtained per unit surface area in the case of the substances in example 5 (this number being measured by infrared spectroscopy and represented by the optical density amplitude of the absorption band at 3747 cm$^{-1}$, FIGS. 11a and 11b are diagrams explaining the surface structure of the initial talc and the talc substance obtained in example 5.

Also the adsorption energy distribution diagram is identical to that for the hydrophilic substance in example 1. The diffraction spectrum of these talc substances is identical to that of the starting material. The infrared spectra are similar to those for the starting material, with the exception of the characteristic peak for silanols at 3747 cm⁻¹. In the talc substances the size of this peak varies in relation to the RP ratio. Measurement of the height of this peak by infrared spectroscopy yielded the diagram in FIG. 10 which relates the magnitude of the optical density OD to wettability. The hydrophilic properties obtained are directly associated with the number of silanol groups formed in the course of the process.

Figure 11A:
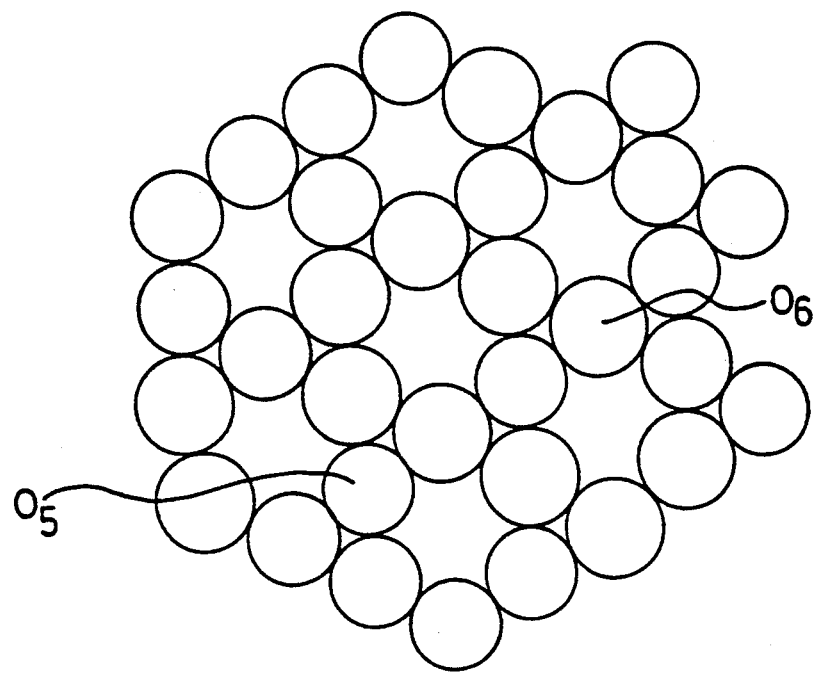
Figure 11B:
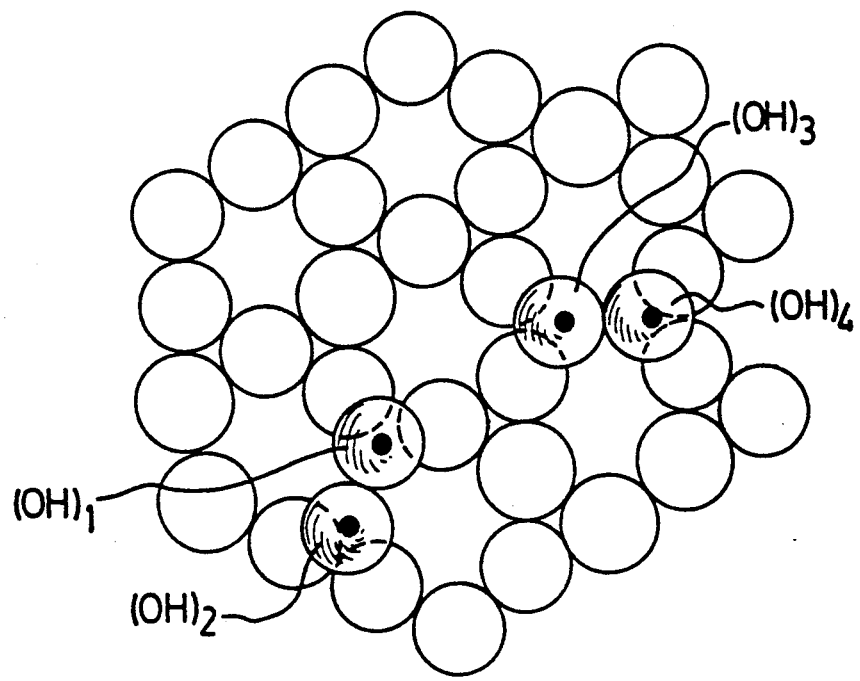

Interpretation of all the results obtained yielded the diagrams in FIGS. 11a and 11b. FIG. 11a shows a view from above of the network of oxygen atoms at the surface of the initial hydrophobic talc (classical hexagonal arrangement). FIG. 11b illustrates the surface of the hydrophilic talc substance obtained (RP>10⁻⁴ mole/m²). Oxygens O₅ and O₆ of the initial talc have been replaced by hydroxyls (OH)₁ and (OH)₂ respectively. Substitution takes place through opening of the siloxane bridges by the following free radical mechanism:

autoclave stage
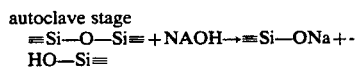
HO—Si≡ neutralisation 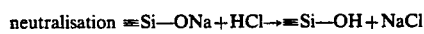

The stability of the hydrophilic substances obtained in this example is identical to that of the initial talc. The surface sheets with silanol groups are bonded to the internal sheets by Van der Waals forces.

EXAMPLE 6

Preparation Similar to that in Example 5 With Variation of the Temperature and Treatment Time in the Autoclave In this example a starting material identical to that in example 5 was subjected to the same treatment with an RP ratio =2 0.10⁻⁴ mole/m², varying the temperature between 80° C. and 300° C. and the treatment time in the autoclave between 45 minutes and 15 hours (crossed tests).

The results show that:
below 150° C. wettability indexes characteristic of a hydrophobic or medium hydrophobic material (index between 45 and 55) are obtained,
above 160° C. an index of 71 is obtained, which is characteristic of a stable hydrophilic material (when the time is longer than 45 minutes, a time which seems to represent the minimum necessary for obtaining a uniform temperature and carrying out the reaction in the autoclave), between 150° C. and 160° C. the index varies in relation to time and is equal to 71 for times in excess of 5 hours.

In practice a temperature over 150° C. (e.g. 160° C.) for a time of over 45 minutes (e.g. 2 to 3 hours for 160° C.) is used. It should be noted that below 150° C. substances which have some hydrophilic character are obtained because of deposits made on the particles. This property disappears however with acid washing (dissolution of the alkaline deposits).

EXAMPLE 7

Preparation by Chemical Means Using an Organic Base

In this example the starting material was identical to that in example 6 and the treatment conditions were as follows:
temperature = 160° C.,
time = 3 hours,
base = sodium methanolate dissolved in methanol,
RP ratio = 2 $0.10^{-4}$ mole/m$^2$.

After cooling the solid phase was separated off by filtration and washed with methanol to eliminate excess reagents. The solid phase was then neutralised with dilute hydrochloric acid (N/10), washed again with water and then dried in a stove at 120° C. for 12 hours.

The talc substance obtained was hydrophilic (Stevens index was 71), stable, and had the same properties as the hydrophilic substances according to the invention obtained in examples 5 or 6.

EXAMPLE 8

Treatment of the Substances Obtained with a Chlorosilane

The talc substance obtained through the use of heat in example 1 was treated in the following way:
suspension of the substance in a solvent (tetrahydrofuran),
addition of 95 g of dimethylchlorosilane per 100 g of talc substance,
shaking and holding at a temperature of 40° C. for 12 hours,
filtering and washing of the powder obtained with tetrahydrofuran (THF),
purification by Soxhlet (trade mark) extraction for 48 hours using THF,
drying in a stove at 100° C. for 24 hours.

The talc substance obtained was then investigated and the results show that SiH(CH$_3$)$_2$ groups are fixed at the silanol sites of the starting hydrophilic material:
Stevens wettability index: 27 mJ/m$^2$ (characteristic of the covering of hydrophilic sites by very hydrophobic CH$_3$ groups),
Infrared spectrum indicating the presence of CH$_3$ bonds (2967 cm$^{-1}$) and SiH bonds (2148 cm$^{-1}$).

When suspended in normal chlorosilane solvents (tetrahydrofuran, acetone, ether) the substances obtained are not adversely affected and retain their new surface properties, which shows that there is a strong bond between the initial hydrophilic talc substance and the molecules grafted onto it.

In addition to this the grafts are not hydrolysed by water.

It should be noted that the treatment of the hydrophilic talc substance described in this example was carried out on natural hydrophobic talc for comparison purposes and no significant grafting occurred.

EXAMPLE 9

Treatment with Alcohol

The procedure in example 8 was repeated using an alcohol (pure isobutanol, treatment temperature: 108° C., time: 6 hours, extraction solvent: acetone) and yielded a talc substance with hydrophobic C(CH$_3$)$_3$ surface groups fixed onto the silanol sites of the starting hydrophilic material (manufactured in accordance with example 1).

The wettability index was 27 mJ/m$^2$ as in the previous example and the infrared spectrum showed that CH$_3$ bonds were present (2967 cm$^{-1}$).

EXAMPLE 10

Treatment with an Organosilane

The hydrophilic talc substances obtained in examples 1 and 5 (Rp = 2 $0.10^{-4}$ mole/m$^2$) were treated with an organosilane (tridecafluoro-1,1,2,2-tetrahydrooctyl-1-dimethylchlorosilane, referred to as C$_6$F$_{13}$) using the following procedure:
suspension of the substance in a solvent (tetrahydrofuran),
addition of $10^{-2}$ moles of C$_6$F$_{13}$ per 100 g of talc substance,
stirring and holding at a temperature of 50° C. for 5 hours,
filtering and washing of the powder obtained with tetrahydrofuran (THF),
purification by "Soxhlet" extraction for 48 hours using THF,
drying in a stove at 100° C. for 24 hours.

The talc substances had a wettability index of 27 mJ/m$^2$. Photo-electron induced surface spectroscopy ("ESCA") revealed that fluorinated organic groups were fixed onto the surface of the particles.

No significant grafting of the fluoride groups was obtained by similar treatment of a natural hydrophobic talc.

EXAMPLE 11

Fixation of an Active Substance

The procedure in example 10 was used for the same hydrophilic talc substances to effect treatment using:
(a) mono-methylsilanetriol ascorbate, sold by the "Exsymol" company (Monaco), or
(b) monomethylsilanetriol dihydroxyprolenate, sold by the same company.

The talc substances obtained were analysed by infrared spectroscopy, and bore grafts at the surface which contained the characteristic groups of ascorbate (C$_6$H$_7$O$_5$) in case (a) and hydroxyprolenate (C$_5$H$_8$NO$_2$) in case of (b).

The substances bearing these active ingredients can be used as medicinal cosmetics (skin anti-ageing effect).

EXAMPLE 12

Fixation of a Colouring Agent

The procedure in example 10 was used on the same hydrophilic talc substances for treatment using:

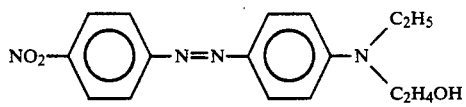

(trade name "RED1", registered trade mark, sold by the Aldrich company).

The talc substances obtained were red, like the basic colouring agent used in the treatment. An easily dispersed colouring pigment which has a greater colouring power for the same amount of colouring agent and which benefited from all the reinforcing properties of the talc filler was thus obtained. This substance can be used in particular as a filler for papers or plastics materials in order to self-colour them.

We claim:

1. A talc substance consisting of particles having a sheet structure, each particle comprising internal hydrophobic sheets, having the crystalline structure of talc within each unit and bonded together by the cohesion forces typical of talc (Van der Waals forces), the said talc substance being characterised in that each particle has at least one hydrophilic surface sheet:
   comprising a network of silicon oxide tetrahedra bearing hydrophilic sites,
   and bound to the inner sheets by forces of the same nature as the cohesion forces existing between the said internal sheets.

2. A talc substance according to claim 1, characterised in that the hydrophilic sites on each surface sheet consist of silanol groups, SiOH.

3. A talc substance according to claim 2, characterised in that each surface sheet consists of a network comprising:
   silicon oxide tetrahedra having a crystalline arrangement identical to that of talc, in which the inert bases of the said tetrahedra form the surface of the sheet,
   silicon oxide tetrahedra which are reversed in relation to the above, in which the said reversed tetrahedra have an active apex located on the surface of the sheet, forming a silanol group, SiOH.

4. A talc substance according to claim 1, characterised in that each surface sheet includes inert siloxane groups characteristic of talc and hydrophilic iOH, SiX or SiRX groups, where X is a halogen and R is an organic chain.

5. A talc substance according to claim 4, characterised in that each surface sheet consists of a network comprising:
   inert siloxane groups having characteristics identical to those present in talc,
   silanol groups SiOH arranged in pairs, originating from the breaking open of siloxane groups.

6. A talc substance consisting of sheet particles, characterised simultaneously by:
   a X-ray diffraction spectrum identical to that of talc, without the characteristic peaks of enstatite,
   an infrared spectrum identical to that of talc having additional weak bands characteristic of hydrophilic groups,
   modified polar and/or non-polar adsorption isotherms yielding bimodal surface energy distribution diagrams (Rudzinski-Jagiello method),
   a wettability index (Stevens index) of between 50 and 71.3 (expressed in mJ per m$^2$),
   stability of the particles to acid and basic solutions identical to that of talc.

* * * * *